(12) United States Patent
Wertz et al.

(10) Patent No.: US 7,880,964 B1
(45) Date of Patent: Feb. 1, 2011

(54) SPACE TELESCOPE WITH FREE-FLYING SECONDARY AND RECEIVER ELEMENTS

(75) Inventors: James R. Wertz, Rolling Hills Estates, CA (US); Richard E. Van Allen, Beverly Hills, CA (US); Paul H. Graven, Redondo Beach, CA (US)

(73) Assignee: Microcosm, Inc., Hawthorne, CA (US)

( * ) Notice: Subject to any disclaimer, the term of this patent is extended or adjusted under 35 U.S.C. 154(b) by 0 days.

(21) Appl. No.: 12/857,476

(22) Filed: Aug. 16, 2010

Related U.S. Application Data

(62) Division of application No. 12/234,483, filed on Sep. 19, 2008, which is a division of application No. 11/079,941, filed on Mar. 15, 2005, now Pat. No. 7,428,098.

(51) Int. Cl.
*G02B 23/00* (2006.01)
(52) U.S. Cl. .................................... 359/429; 359/399
(58) Field of Classification Search ............... None
See application file for complete search history.

(56) References Cited

U.S. PATENT DOCUMENTS

| 4,883,348 A * | 11/1989 | Spivey et al. ............. 359/857 |
| 2003/0227696 A1 * | 12/2003 | Maker ....................... 359/850 |

* cited by examiner

*Primary Examiner*—Stephone B Allen
*Assistant Examiner*—Derek S Chapel
(74) *Attorney, Agent, or Firm*—Noel F. Heal

(57) ABSTRACT

A space telescope having a primary mirror for focusing and reflecting electromagnetic radiation, multiple secondary mirrors and, optionally, multiple tertiary mirrors, for receiving the focused and reflected electromagnetic radiation from the primary mirror and reflecting the electromagnetic radiation, and multiple focal plane arrays for receiving the focused and reflected electromagnetic radiation from the secondary mirrors or tertiary mirrors. The use of a multiple secondary mirrors and multiple focal plane arrays allows the telescope to observe multiple fields of regard simultaneously in selected celestial regions or on an orbited celestial body, such as the Earth.

6 Claims, 10 Drawing Sheets

FIG. 1D
FIGURE NOT DRAWN TO SCALE

View from Orbited Body

FIG. 3
FIGURE NOT DRAWN TO SCALE

FIG. 4
FIGURE NOT DRAWN TO SCALE

FIG. 6

SPACE TELESCOPE WITH FREE-FLYING SECONDARY AND RECEIVER ELEMENTS

CROSS-REFERENCE TO RELATED APPLICATION

This is a divisional of prior pending application Ser. No. 12/234,483, filed Sep. 19, 2008, entitled SPACE TELESCOPE WITH FREE-FLYING SECONDARY AND RECEIVER ELEMENTS, which was a divisional of prior application Ser. No. 11/079,941, filed Mar. 15, 2005, entitled STRUCTURELESS SPACE TELESCOPE®, issue date Sep. 23, 2008, U.S. Pat. No. 7,428,098. The entire prior applications are hereby incorporated by reference into this specification.

BACKGROUND OF THE INVENTION

1. Field of the Invention

The present invention relates to apparatus and methods for the implementation of a space telescope. Particularly, the present invention relates to apparatus and methods for high resolution surveillance telescopes that operate from space.

2. Description of the Related Art

Since the discovery of optics and the invention of the telescope there has been a desire to create novel designs and techniques to enable the viewing of objects at greater distances and in greater detail. One fundamental principle of telescope design is that if a device captures and focuses more light, it can be used to see fainter objects. Thus, all powerful telescopes incorporate large apertures and lenses to capture as much light as possible. Further, the resolution of all space telescopes is inversely proportional to the aperture. Thus, very large apertures are needed to see small objects or fine detail.

Space based telescopes have been previously used for both astronomical and Earth observations. Respecting astronomical observation, space based telescopes have an obvious advantage over any terrestrial telescope as they are unhindered by the distorting effects of the Earth's atmosphere. Space based telescopes have also been used for Earth observation for both scientific as well as surveillance missions. In this case, the distortion is not eliminated, as the space based telescope now peers back through the atmosphere at the Earth, but is greatly reduced because the telescope itself is outside the Earth's atmosphere. Space-based telescopes have the advantage of seeing large areas of the Earth, but are limited in their ability to see small objects or fine detail because of the large distance. The only way to overcome this is to build a telescope with a very large aperture.

As a consequence of the cost and difficulty of delivering objects to Earth orbit, there is a significant constraint on the size and mass of all space-based devices. In addition, large lightweight structures do not have the rigidity needed for precision optical telescopes and vibrations from any source are transmitted to all of the optical components.

In view of the foregoing, there is a need for telescope designs which allow very large optical systems to be launched and which mitigate the adverse effects of lightweight structural elements. The present invention meets these needs.

SUMMARY OF THE INVENTION

Embodiments of the present invention provide for a space based telescope with extremely high resolution that may be used for astronomical or Earth observation, particularly surveillance missions. In addition, embodiments of the present invention may be used for continuous real time observation.

Embodiments of the present invention can be configured to include the fundamental components of a well known folded reflective telescope configuration (e.g. a Cassegrainian folded optics telescope system). A primary mirror is used to focus and reflect incoming electromagnetic radiation (e.g. visible light) from the observed object. The focused and reflected radiation is directed to a secondary mirror that reflects the radiation to a focal point array. A tertiary mirror can also be included in the design. The focal point array receives the focused and reflected radiation which can now be interpreted as the observed object. A key component of embodiments of the present invention is the use of a structureless primary mirror and secondary and possibly tertiary mirrors in the space telescope. It is important to note that the invention is not restricted to the reflective telescope design; other telescope designs can also be developed employing a structureless mirror according to the present invention.

The structureless primary mirror of the present invention comprises a plurality of independent mirror elements that are free from each other but controlled and coordinated to operate in a specified pattern as a coherent primary mirror. For example, one hundred or more independent disconnected mirror elements can be disposed in a pattern in space to form a functional primary mirror. The control and coordination of the independent mirror elements can be accomplished through the use of a laser system. Pressure from laser light can be used to align the array and maintain the pattern. One or more lasers are used to intermittently fire at specific locations on each mirror element as necessary to maintain the primary mirror orientation and position. In addition, the mirror elements can be disposed in an orbital path which minimizes the gravity gradient across the primary mirror array, thereby lessening the control and coordination problem.

A separate system can be employed with embodiments of the space telescope for large order maneuvers of the primary mirror such as initialization, stationkeeping, mirror movement, and repointing. The maneuver system can utilize mirror mover units which comprise small autonomous spacecraft that are intermittently employed to grab one or more of the mirror elements of the primary mirror and manipulate them appropriately. For example, a single mirror mover can be used to manipulate a hexagonal pattern of seven mirror elements. The mirror movers may employ efficient electric propulsion systems. Electromagnets can be used by the mirror movers to grab and hold the mirror elements during a maneuver.

The secondary and tertiary mirrors of the telescope may also be structureless in that no structure is used to hold the secondary or tertiary mirror in place with respect to the primary. They are held in place by very small, but continuous low level forces provided by, for example, electric propulsion. This means that there is no structure to block the incoming light and no structure to introduce motion or vibration into the primary mirror. In addition, the secondary or tertiary mirrors can be placed as far away from the primary as is desirable for optical purposes, rather than being constrained by the available size of structural elements.

The primary mirror of the space telescope can be shielded by a sunshade that also has solar cells on the exterior surface to supply power for the system. For example, the sunshade could be cylindrical with open ends and have an opening in the side in the viewing direction of the space telescope for geosynchronous applications and a more conventional rectangular plate shape or layered plate configuration for other locations. Power and communications antennas can be placed on the interior surface to provide power, commands, and telemetry to the mirror movers, control lasers, secondary and tertiary mirrors, and the focal plane arrays (FPAs). The control lasers may be disposed above and below the open ends of the cylindrical sunshade example such that all of the primary mirror elements can be hit by one or more control lasers so as to provide continuous control in both orbit and attitude in all three axes. The locations of the control lasers are such that they can apply forces to any of the tabs on the mirror elements from the front or back, right or left, and above or below.

In one exemplary space telescope design, large changes in the field of regard are made by moving the secondary mirror through distances much larger than the secondary mirror itself. Thus, an alternative to moving the secondary mirror is to employ one or more secondary mirrors focusing on one or more FPAs near the center of the primary mirror. The FPAs can be placed at locations other than the center of the primary mirror, as long as the FPAs are placed at a focal point. Because there is no structure connecting the secondary mirrors to each other or to the primary mirror, they are entirely independent. In this manner, different observations can be conducted simultaneously employing the same primary mirror. For example, one secondary mirror/FPA can be scanning the sky (or Earth) to cover large areas quickly while another is staring at a particular target of interest for a sustained period. Accordingly, secondary mirrors and/or FPAs can be added to create as many independent fields of view as desired so long as they do not physically interfere with each other. Allowing for multiple secondary mirrors and/or FPAs provides a great advantage to the system because a single primary mirror is providing the main optical component for many nearly independent scanning or stationary telescopes. Therefore, the effect is to significantly multiply the return on investment for the telescope or, equivalently, reduce the cost per image. From the user viewpoint, multiple secondary mirrors permits options to simultaneously stare at or track multiple targets continuously.

In one exemplary orbital configuration of the space telescope, only the one or more secondary mirrors, and possibly the control lasers, are in non-Keplerian orbits, requiring continuous control to maintain their positions. This configuration minimizes the required control forces and, therefore, the propellant, needed to maintain the telescope configuration over time. A second key advantage of this configuration is that field of regard of the telescope can be moved over a very large angular area by changing only the position and orientation of the one or more secondary mirrors. Thus, the primary mirror can remain fixed while the one or more secondary mirrors are used to search large portions of the sky or locations on Earth.

As briefly described above, the present invention encompasses numerous novel and inventive systems, components and methods. Various embodiments of the invention include, without limitation, a structureless mirror array in a space telescope, a laser control system for a structureless array, mover units for mirror maneuvering and manipulation, as well as exemplary space telescope designs and orbital configurations. These and other embodiments of the invention are detailed hereafter.

BRIEF DESCRIPTION OF THE DRAWINGS

Referring now to the drawings in which like reference numbers represent corresponding parts throughout:

FIGS. 1B and 1C illustrate a schematic diagram of an exemplary embodiment of a structureless component array of objects in an orbital path with a minimized gravity gradient across the array, while

DETAILED DESCRIPTION OF THE PREFERRED EMBODIMENT

In the following description of the preferred embodiment, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

1.0 Structureless Component Array and Orbital Configuration

Figure 1A:
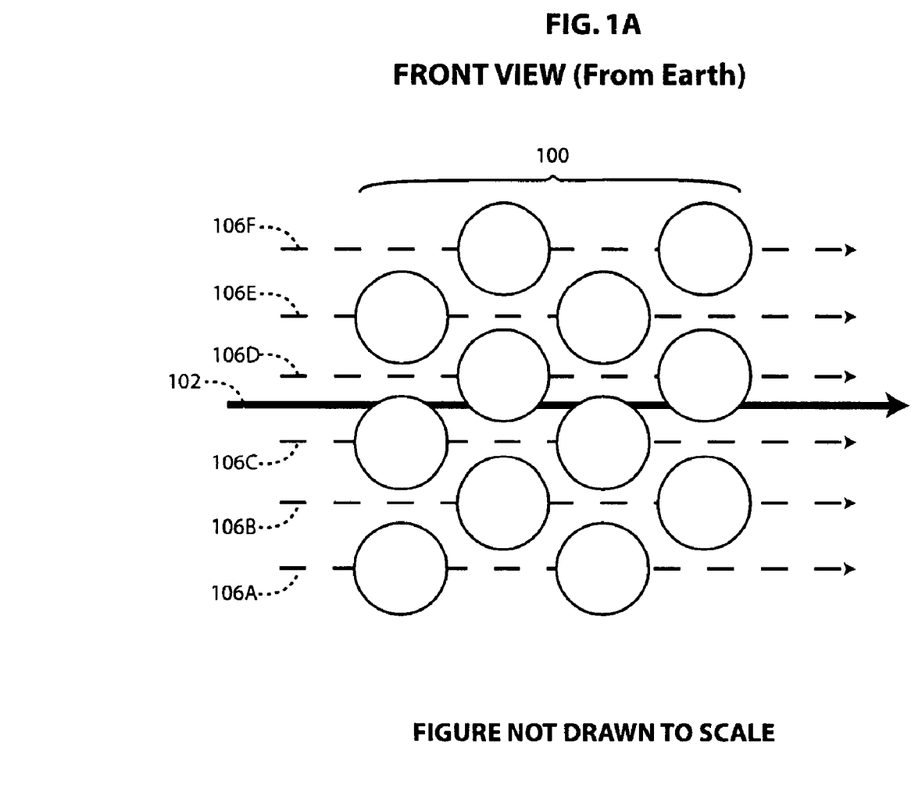
FIG. 1A illustrates a schematic diagram of a structureless component array of objects in an orbital path with a gravity gradient across the array.
Figure 1B:
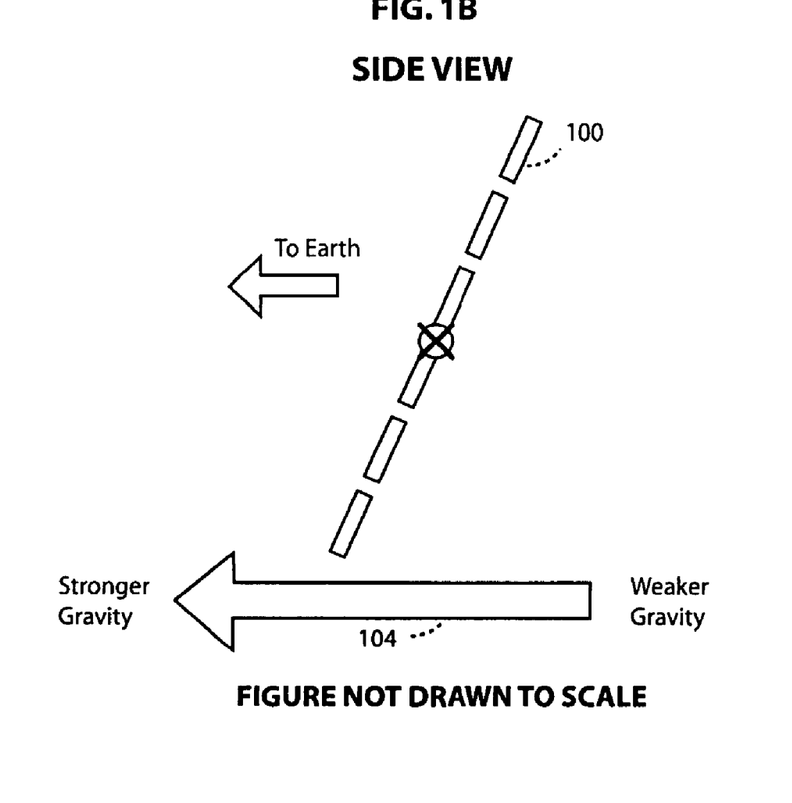
Figure 1C:
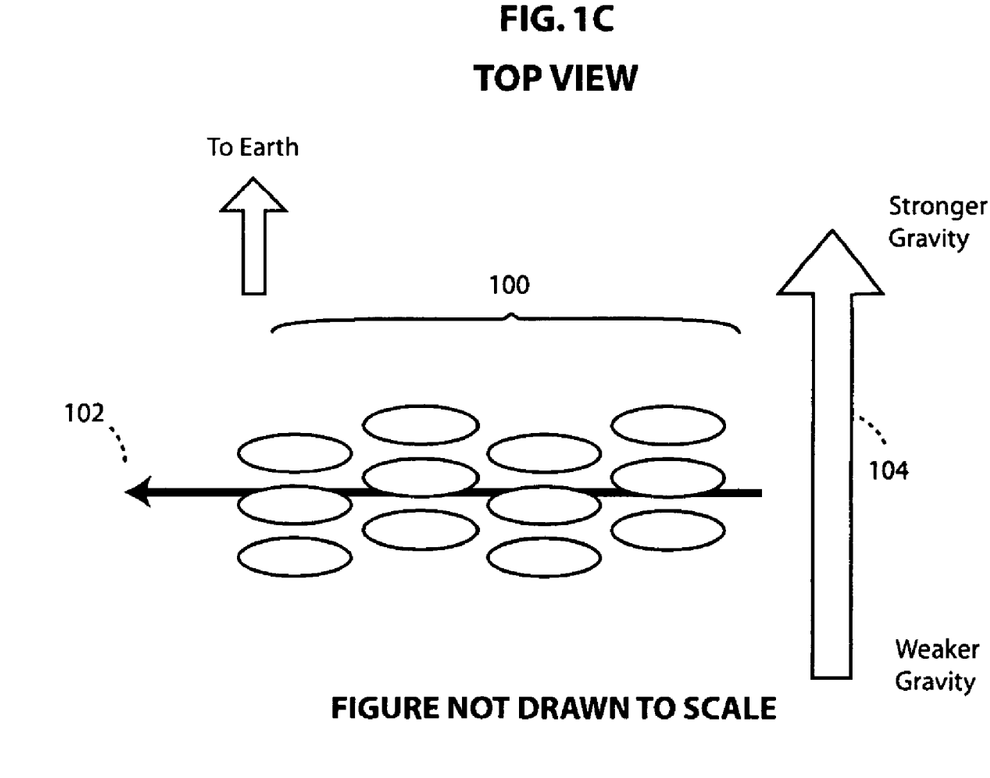

FIGS. 1A, 1B, and 1C represent a schematic diagram of a structureless component array of objects in an orbital path with a gravity gradient across the array. The "X" in the center of FIG. 1B indicates that the direction of travel 122 is into the page. Ordinarily, a plurality of independent orbiting objects 100 spaced a short distance apart in any direction other than along the nominal orbital path 102 (the orbital path of the mass center of the plurality of objects) will move toward or away from each other due to a gravity gradient 104 resulting from each of the independent objects being in slightly different orbital paths 106A-106F. Controlling and coordinating of a large number of such objects 100, if possible, would require significant constant orbital correction of each of the objects 100.

Figure 1D:
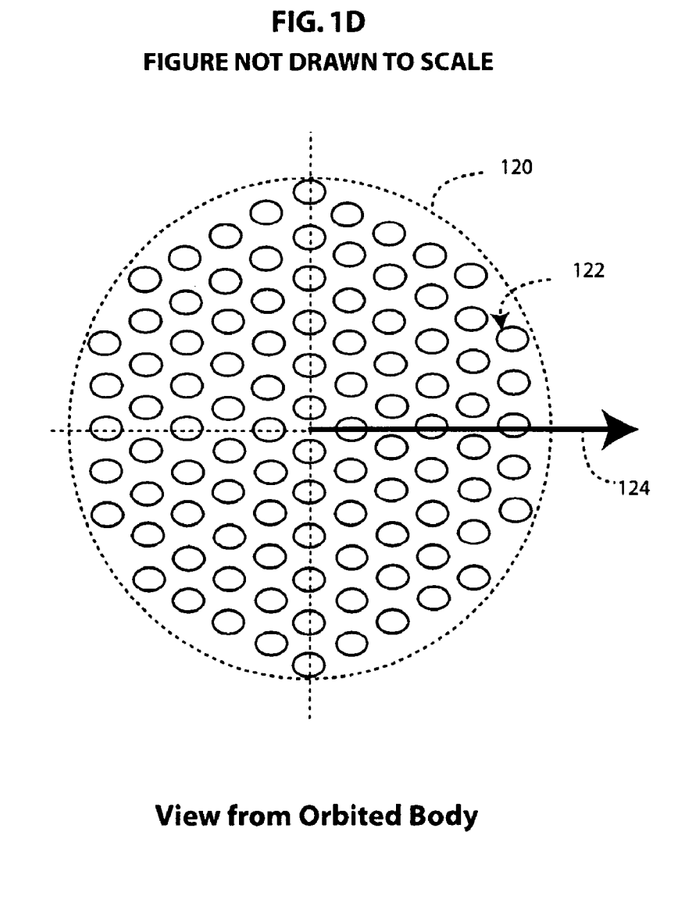
FIGS. 1D and 1E illustrate views from the orbited body and an orthogonal view, respectively, of a schematic diagram of an exemplary embodiment of a structureless array of objects in an orbital path with a minimized gravity gradient across the array.
Figure 1E:
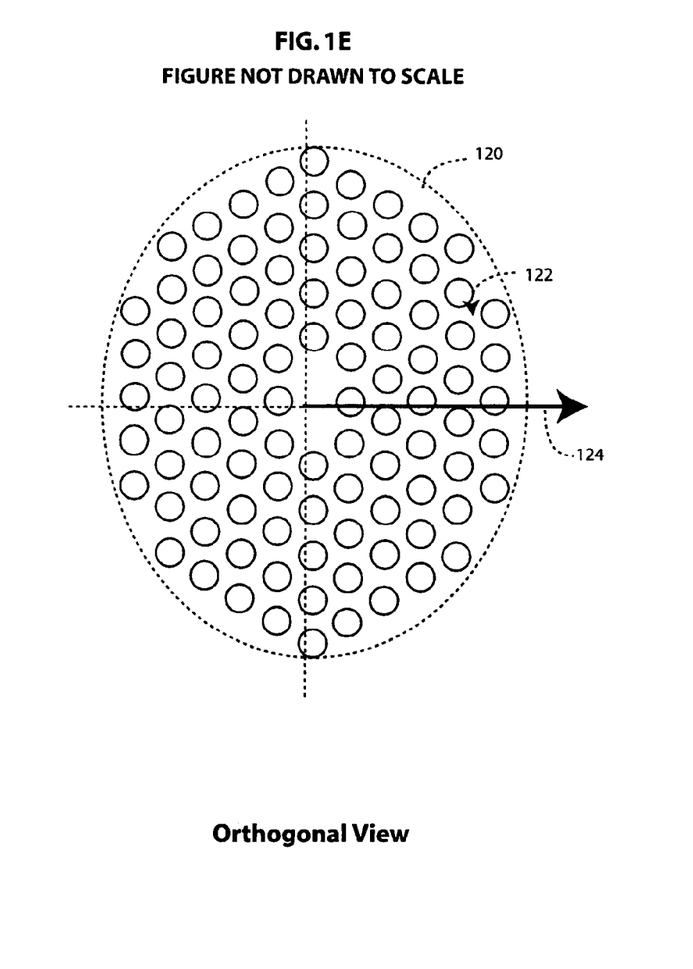

FIGS. 1D and 1E illustrate a schematic diagram of an exemplary embodiment of a structureless component array 120 of objects 122 in an aggregate orbital path 124 with a minimized gravity gradient across the array 120. The plurality of objects 122 are disposed in an elliptical pattern that is tipped such that the along-track axis is twice the length of the radial axis and the pattern undergoes a stable rotation in which all of the objects 122 maintain their positions relative to each other. The "X" in the center of FIG. 1B indicates that the direction of travel 122 is into the page. Thus, each of the objects 122 moves in a substantially true Keplerian orbit. In this case, the relative positions of the plurality of objects 122 remain substantially stable with respect to each other. Only very small corrective forces are required to counteract perturbations of the objects' orbits. Applying this principle in various embodiments of the invention, a plurality of separate individual objects 122 can be economically coordinated to operate in a large array 120 in space.

In particular space telescope embodiments of the present invention, a key component of the telescope is a very large mirror in space used for astronomical and/or Earth observations "constructed" of separate free-flying mirror elements in a pattern and orbital configuration such that a gravity gradient across the pattern of mirror elements is minimized. For example, a mirror constructed of free-flying independent mirror elements placed in an elliptical pattern in a geosynchronous orbit that is tipped such that the along-track axis is twice the length of the radial axis undergoes a stable rotation in which all of the mirror elements substantially maintain their positions relative to each other.

Because the ellipse in the geosynchronous orbit example is tipped back approximately 26.6 degrees, each mirror element is moving in a substantially true Keplerian orbit and the mirror as a whole appears to rotate as a single solid object with some compression in the along-track direction. See FIGS. 1B and 1E. The great advantage of this configuration is that the mirror elements can be maintained in their individual orbits by applying only very small corrective forces to overcome perturbing forces due to the Sun, Moon, and higher-order harmonics in the Earth's geopotential.

In particular space telescope embodiments of the present invention, a key component of the telescope is a very large mirror in space used for astronomical and/or Earth observations "constructed" of separate free-flying mirror elements in a pattern and orbital configuration such that a gravity gradient across the pattern of mirror elements is minimized as the pattern of mirror elements orbits. For example, a mirror constructed of free-flying independent mirror elements placed in an elliptical pattern that is tipped such that the along-track axis is twice the length of the radial axis undergoes a stable rotation in which all of the mirror elements substantially maintain their positions relative to each other. Thus, each mirror element is moving in a substantially true Keplerian orbit and the mirror as a whole appears to rotate as a single solid object with some possible compression in a given direction for a given configuration of mirror elements. If the mirror array is tipped with respect to the Earth, e.g., at 26.6 degrees, the mirror elements can be maintained in Keplerian orbits. See FIGS. 1B, 1D and 1E. The great advantage of this configuration is that the mirror elements can be maintained in their individual orbits by applying only very small corrective forces to overcome perturbing forces due to the Sun, Moon, and higher-order harmonics in the Earth's geopotential.

Orbit control of the structureless component array and other supporting components may be accomplished through application of the principles and techniques described in U.S. Pat. Nos. 5,528,502 and 5,687,084, by Wertz, entitled, "SATELLITE ORBIT MAINTENANCE SYSTEM," both of which are incorporated by reference herein.

Although the present invention provides the example of a structureless component array applied to the primary mirror of a folded reflective orbital space telescope, the invention is not limited to this application or this specific embodiment. For example, other telescope designs can also employ the structureless array. In addition, the structureless component array can be employed in a deep space telescope where there is no gravity gradient problem and no orbital design is required. Also, such a structureless array is not limited to telescope applications; a structureless array may also be employed as a communications antenna. Furthermore, the use of an orbital design where every component of the array is in a substantially true Keplerian orbit is desirable for its efficiency but not necessary; the cost and difficulty of controlling the array increases with the use of one or more array components in non-Keplerian orbits.

2.0 Exemplary Telescope System in Earth Orbit

Figure 2:
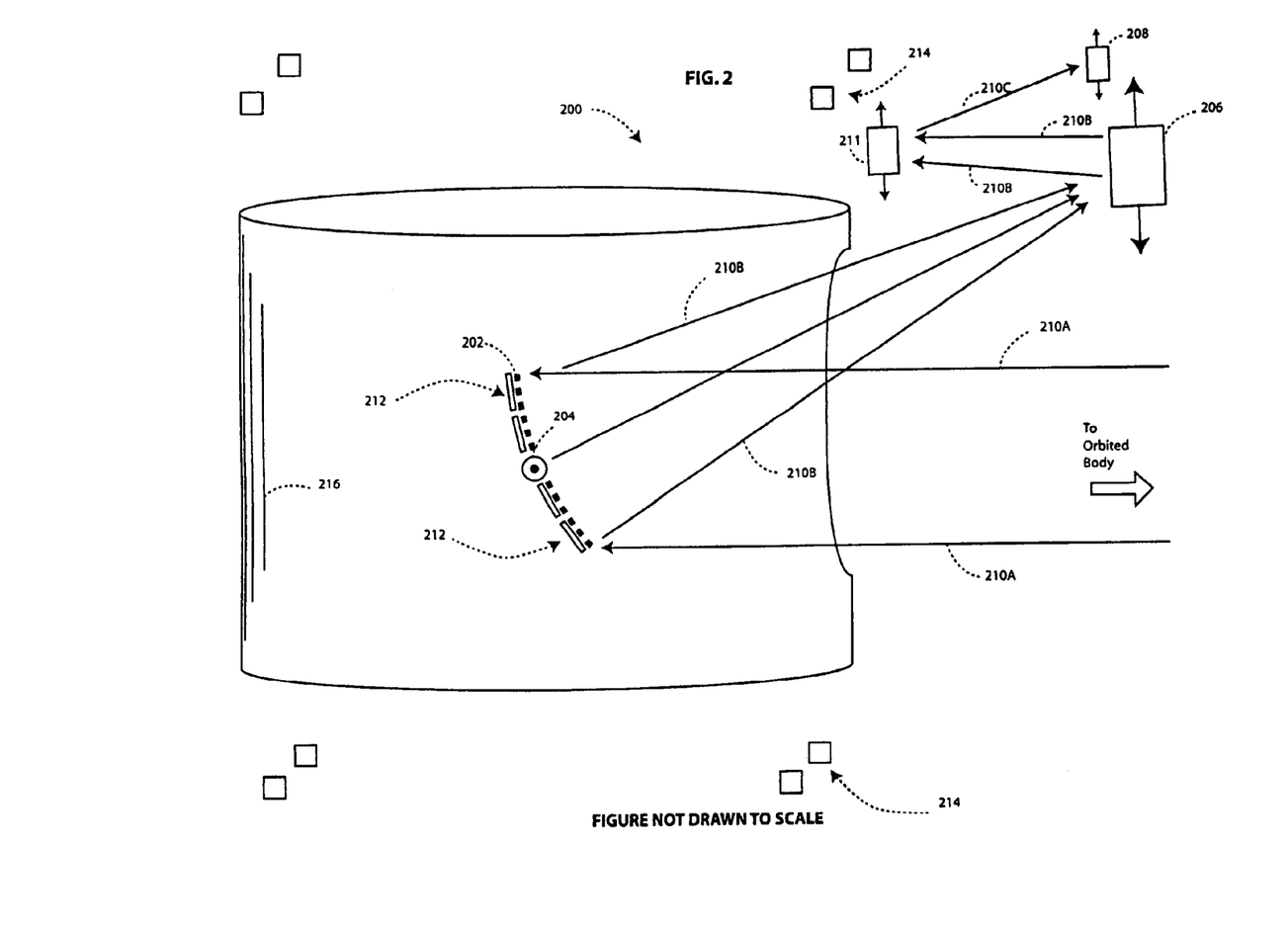
FIG. 2 illustrates a schematic diagram of an exemplary embodiment of a space telescope system of the present invention operating in Earth orbit.

FIG. 2 illustrates a schematic diagram of an exemplary embodiment of a space telescope system 200 of the present invention operating in Earth orbit. The structureless primary mirror 202 of the telescope system can comprise a plurality of free independent mirror elements in a pattern and orbital configuration as described in the previous section. The nominal orbital path 204 (which is out of the plane of the figure) of the space telescope 200 can be in a geostationary to enable continuous observation of any location within the visible hemisphere. Thus, the primary mirror 202 will undergo a full rotation one time per day as the plurality of mirror elements are each in substantially stable Keplerian orbits that maintain the functional integrity of the array. The plurality of mirror elements of the primary mirror 202 are coordinated and controlled together to focus and reflect electromagnetic radiation (e.g. visible light) 210A received from the observed location (e.g. a location on the orbited body). Other orbital configurations for the plurality of mirrors of the primary mirror 202 are also possible in order to perform astronomical observations.

In the exemplary telescope 200 a secondary mirror 206 is disposed in front of and above or below the primary mirror 202 to reflect the focused electromagnetic radiation 210B received from the primary mirror 202. A tertiary mirror 211 is used to further reflect and focus the electromagnetic radiation. Finally, a focal plane array 208 is disposed substantially at the center of the primary mirror 202 to receive the focused electromagnetic radiation 210C reflected from the tertiary mirror 211. The focal plane array receives and/or processes the focused electromagnetic radiation 210C which presents an image of the observed location.

Different parameters in the design of the primary mirror 202 can be adjusted depending upon the desired performance and other considerations. For example, it is acceptable that there be some spacing between the plurality of mirror elements. However, greater spacing between the mirror elements reduces the light gathering ability of the telescope negatively impacting the frame rate of the delivered images. Similarly, the absence of some mirrors in the array (a lower fill factor), which may be the result of mirror degradation, mirror pointing errors, or other reasons, also undercuts the light gathering. One benefit of a free secondary mirror 206 is the elimination of diffraction effects from structural supports of the secondary mirrors in traditional reflective telescopes.

The structureless primary mirror 202 can utilize one or more mirror element movers 212 generally disposed behind the mirror elements of the primary mirror 202 to provide for intermittent manipulation of the mirror elements through large order maneuvers. Such large order maneuvers include initialization, stationkeeping, mirror movement, and repointing of the primary mirror 202. The mirror element movers 212 effectively operate as independent spacecraft that are each responsible for the manipulation of a plurality of the mirror elements. Fine tuning of the array of mirror elements of the primary mirror 202 can be accomplished through a separate system.

Control lasers 214 can be employed for fine tuning of the primary mirror 202. The lasers 214 are selectively and precisely fixed at control tabs on the mirror elements such that the light pressure from the lasers applies very small forces to the elements to control their orbits and attitude in three axes. In the exemplary telescope 200, a plurality of lasers 214 are disposed on separate platforms such that together they can hit all of the control tabs of all of the mirror elements. For example, in one configuration, eight laser platforms are configured in a cubic pattern such that one laser is disposed at each corner of an imaginary cube around the primary mirror 202.

Other components to support operation of the telescope can also be employed as necessary. For example, and not by way of limitation, as part of the thermal design the primary mirror 202 may also be surrounded by a large cylindrical sun shade 216 with open ends to allow the lasers 214 access to the primary mirror 202. Solar cells can be disposed on the exterior surface of the sunshade 216 to provide power to various components of the telescope 200. Power and communications antenna on the interior surface of the sunshade 216 can provide power, commands, and telemetry to the mirror element movers 212. In an alternate embodiment, the lasers 214 can be built into the structure of the sunshade 216.

In this exemplary telescope 200 only the secondary mirror 206, and possibly the control lasers 214, are in non-Keplerian orbits. Thus, only these components would require continuous control to maintain their positions. Each of the plurality of mirror elements (which comprise the largest number of elements) can operate in substantially true Keplerian orbits. This configuration minimizes the required control forces needed to maintain the telescope 200. Accordingly, the propellant needed to maintain the telescope 200 configuration over time is also reduced. Another advantage of this configuration is that field of regard of the telescope 200 can be moved over a very large angular area by changing only the position and orientation of the secondary mirror 206. Thus, the primary mirror 202 can remain fixed while the secondary mirror 206 is used to search large portions of the sky or Earth.

One exemplary embodiment of the telescope 200 can employ a 30 m diameter primary mirror 202. The primary mirror 202 can be disposed in a geostationary orbit and comprise approximately 98 independent mirror elements controlled by selectively applying light pressure from eight control lasers arranged in a cubic configuration surrounding the primary mirror 202. The total on-orbit mass would be on the order of 10,000 kg with power requirements on the order of 20 kW. A functional telescope with these characteristics can deliver approximately 1 m resolution continuous (e.g., 30 frames/second) images over a field of view of approximately 20 km. The configuration can produce approximately one hundred times the light gathering ability of conventional low Earth orbit observation telescopes.

3.0 Mirror Elements and Laser Control

Traditional methods of control do not allow the fine level of control needed for an optical instrument in space, which must be controlled to a fraction of the wavelength of visible light. Using light pressure from a laser provides an extremely small, very accurate, and controllable force that can be used to control both the attitude and position of independent free-flying mirror elements employed in a primary mirror 202 of a telescope 200.

Figure 3:
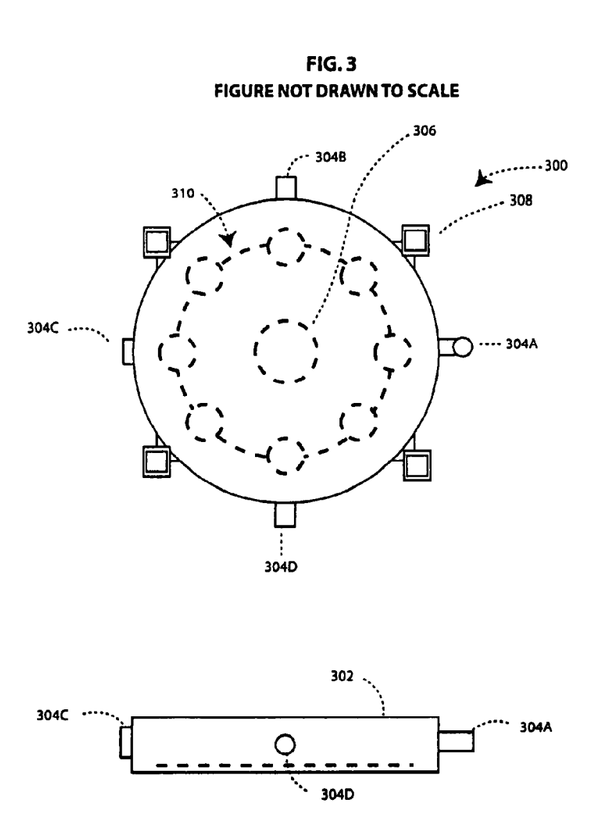
FIG. 3 illustrates a schematic diagram of an exemplary embodiment of a mirror element of the present invention.

FIG. 3 illustrates a schematic diagram of an exemplary embodiment of a mirror element 300 of the primary mirror 202. In the exemplary embodiment, the mirror elements 300 are essentially passive devices maneuvered through external manipulation by the lasers 214 or the movers 212. The front surface 302 of mirror element 300 is made acceptably reflective. Control tabs 304A-304D are disposed at ninety degree intervals around the perimeter of the exemplary circular mirror element 300. As discussed above, the lasers 214 are selectively fired at the control tabs 304A-304D to orient and move the mirror element in order to tune the primary mirror 202.

The mirror element 300 may include a wire loop 306 comprising one or more coils that are either buried within the mirror element 300 or disposed on the back side of the mirror element 300. The wire loop 306 may be formed from a high-temperature superconductive material.

In an alternative embodiment, the mirror element can be operated actively by including a laser tab 308 that receives laser light in order in order to drive an on-board power cell. When activated, the power cell drives wire coils 310 to produce a magnetic field that interacts with the magnetic manipulation from the mover 212. The mirror element 300 should be substantially non-magnetic in an off state to minimize being disturbed by environmental magnetic fields. Magnetic manipulation of the mirror elements 300 is detailed further in the following section.

4.0 Magnetic Control of Mirror Elements and Mirror Mover

Figure 4:
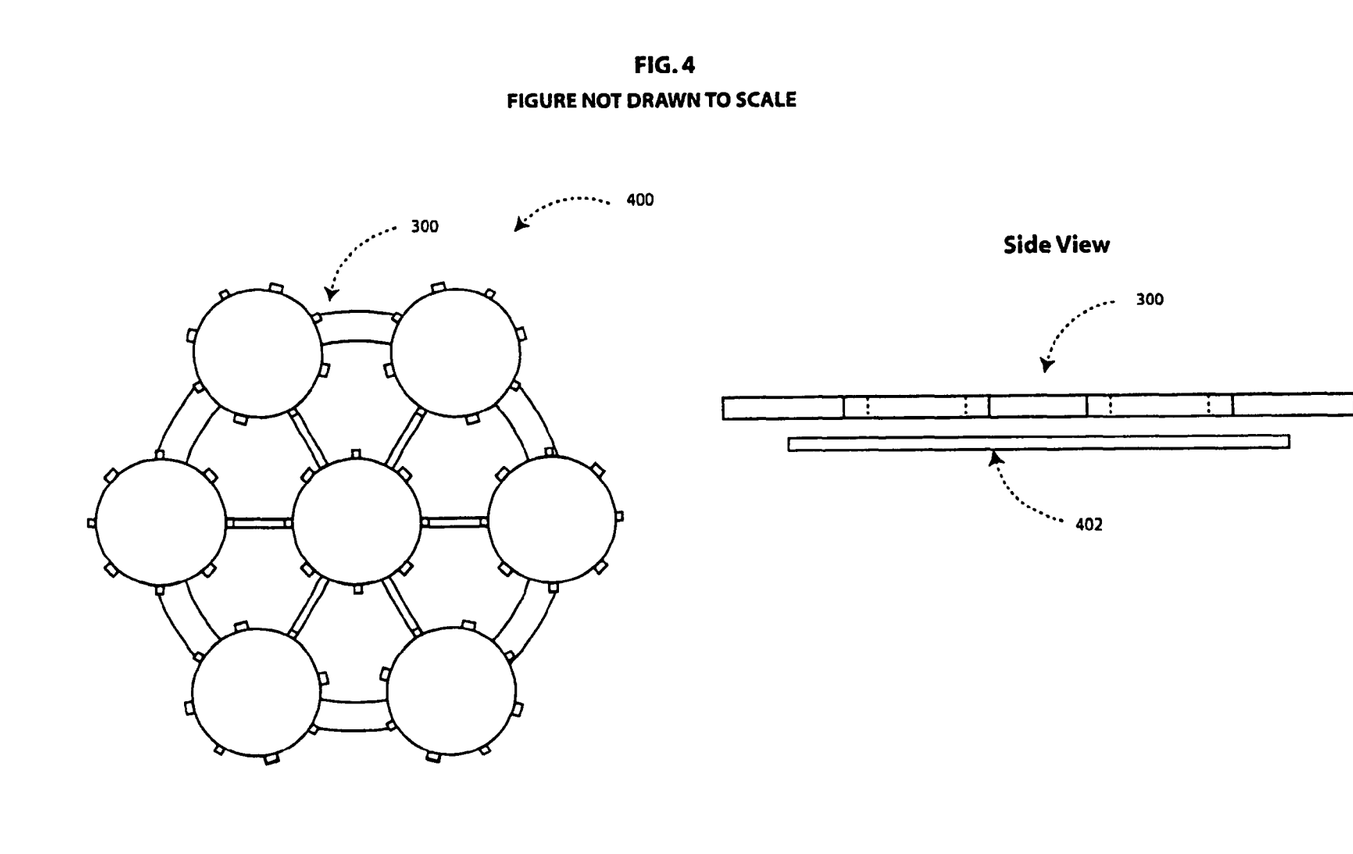
FIG. 4 illustrates a schematic diagram of an exemplary embodiment of an electromagnetic control system of the mirror elements.

Electromagnets have been used in space for many years to control the orientation of spacecraft. For example, it is well known that electromagnets acting against the Earth's magnetic field can provide torque on an orbiting, object. However, the magnetic field is not capable of providing forces to move the center of mass and affect an object's position. However, using electromagnets to provide very small forces at short distances between a mirror element and a larger, more stable mirror mover 212 can provide accurate, low level control of both orbit and attitude for initialization of free-flying mirror elements.

FIG. 4 illustrates a schematic diagram of an exemplary embodiment of a mirror element mover 400 of the present invention. Unfortunately, the laser forces of the tuning system previously described are insufficient to control mirror elements 300 for initialization, stationkeeping, mirror movement, and repointing. However, these functions can be satisfied by a mirror mover 400, capable of grabbing and holding a plurality of mirror elements 300 using forces from an electromagnetic control device 402 (e.g., comprising a plurality of small electromagnets) in the mirror mover 400 disposed proximate to the carrying surface 404. These forces are strong enough to hold the mirror elements 300 in place with the mover 400 through precise accelerations in an approximate range of 1 to 100 micro Gs. The mover 400 may use an electric propulsion motor (not shown) to accelerate and decelerate the mover 400 and the plurality of mirror elements 300 that it carries. The mover 400 then releases each mirror element 300 by slowly reducing the magnetic forces so as to minimize the tip-off rates and allow each mirror element 300 to be brought into control by the laser 214 control system.

In the exemplary mover 400 shown, seven mirror elements 300 are carried in a roughly hexagonal pattern on the carrying surface 404 of the mover 400. In other embodiments, a mover 400 can be designed to carry any number of mirror elements 300 in any desired pattern on the mover 400. Electromagnets on the mirror mover 400 interact with the coils 310 on the mirror elements 300 for both grabbing onto and holding the mirror elements 300 during initial deployment and for moving the mirror elements 300 during station keeping maneuvers. The mirror movers 400 then release the mirror elements 300 very precisely so that the motion of the mirror elements 300 is within the control capabilities of the control lasers 214.

5.0 Multiple Secondary Elements and Receivers

As described above, large changes in the field of regard can be made by moving the secondary mirror through distances much larger than the secondary mirror itself. For example, the secondary mirror of the exemplary telescope 200 previously described may only be a few meters across. However, such a telescope 200 with a 30 m aperture in a geostationary orbit would allow secondary mirror movements of approximately 80 m to provide Earth coverage. This range of motion allows for the use of multiple secondary mirrors and focal plane arrays, as well as possibly using tertiary mirrors to expand the field of regard for the telescope 200.

Figure 5:
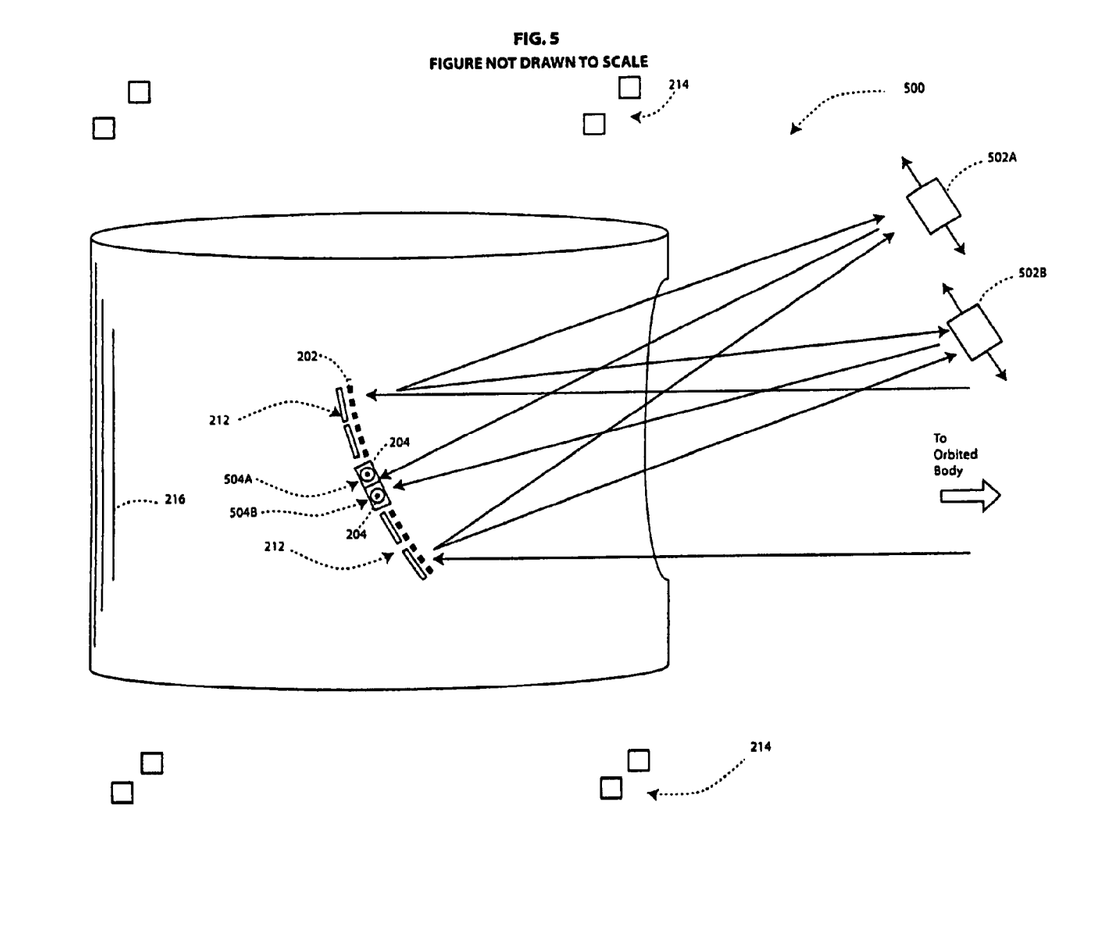
FIG. 5 illustrates a schematic diagram of an exemplary embodiment of a space telescope system of the present invention employing multiple secondary mirrors and/or receivers.

FIG. 5 illustrates a schematic diagram of another exemplary embodiment of a space telescope 500 system of the present invention employing multiple secondary mirrors 502A, 502B and/or focal plane arrays 504A, 504B. As an alternative to moving the secondary mirror as in the telescope 200 of FIG. 2, a second secondary mirror 502B focusing on a second focal plane array 504B near the center of the primary mirror 202 can be employed. Because there is no structure connecting the secondary mirrors 502A and 502B to each other or to the primary mirror 202, they are entirely independent. Thus, one secondary mirror 502A may be scanning the sky (or Earth) to cover large areas quickly while the other secondary mirror 502B is staring at a particular target of interest for an extended period.

Furthermore, additional secondary mirrors and focal plane arrays can be added to create as many independent fields of view as desired so long as they do not physically interfere with each other. Further, the different secondary mirrors and/or focal plane arrays 504A, 504B can be mission-specialized, having different performance characteristics or capabilities. In addition, embodiments of the invention can employ a plurality of secondary mirrors 502A, 502B using either a common focal plane array 208 or separate focal plane arrays 504A, 504B as desired. This aspect of the invention provides an enormous advantage to the telescope 500 because a single primary mirror 202 is providing the main optical component for a plurality of nearly independent scanning or stationary functional telescopes. This capability greatly multiplies the return on investment for the telescope 500 or similarly reduces the cost per image.

6.0 Exemplary Method of the Invention

Figure 6:
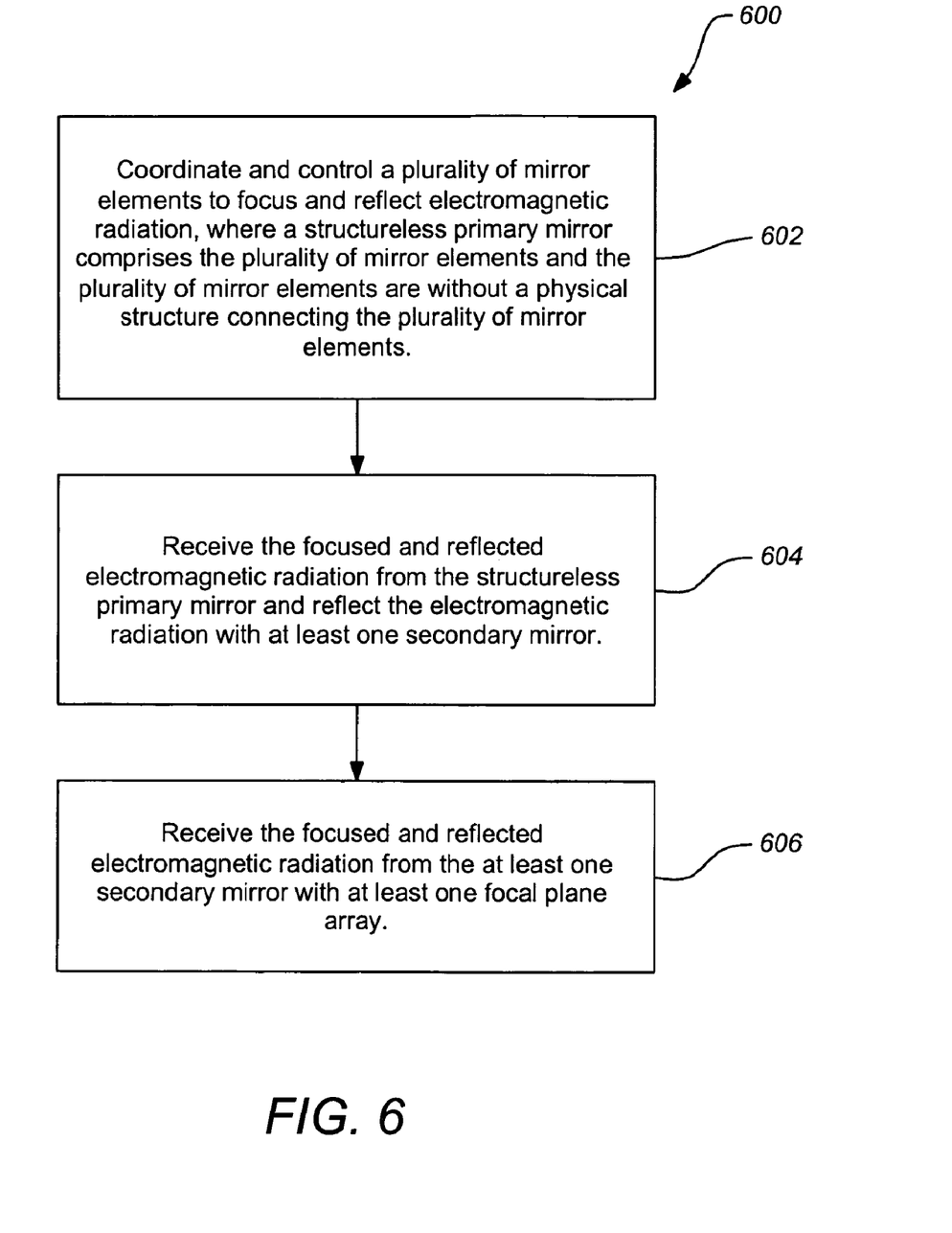
FIG. 6 is a flowchart illustrating an exemplary method of implementing the present invention.

FIG. 6 is a flowchart illustrating an exemplary method of observing according to the present invention. The observing method 600 includes a first step 602 of coordinating and controlling a plurality of mirror elements to focus and reflect electromagnetic radiation. A structureless primary mirror comprises the plurality of mirror elements and the plurality of mirror elements are without a physical structure connecting the plurality of mirror elements. Next at step 604, the focused and reflected electromagnetic radiation is received from the structureless primary mirror and reflected with at least one secondary mirror. Finally at step 606, the focused and reflected electromagnetic radiation from at least one secondary mirror is received by at least one focal plane array. The observing method 600 can be further modified by the additional and alternate structural elements previously described.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended and the equivalents thereof.

The invention claimed is:

1. A space telescope, comprising:
   a primary mirror for focusing and reflecting electromagnetic radiation;
   a plurality of free-flying secondary mirrors for receiving the focused and reflected electromagnetic radiation from the primary mirror and reflecting the electromagnetic radiation; and
   a plurality of free-flying focal plane arrays, equal in number to the plurality of free-flying secondary mirrors, for receiving the focused and reflected electromagnetic radiation from corresponding ones of the plurality of secondary mirrors;
   wherein the primary mirror, the plurality of secondary mirrors and the plurality of focal plane arrays are coordinated and controlled without a physical structure connecting the plurality of mirror elements;
   and wherein the plurality of secondary mirrors and the plurality of focal plane arrays are positioned to provide a selection of images covering multiple fields of regard of the telescope, but without moving the primary mirror.

2. A space telescope as defined in claim 1, wherein the secondary mirrors are spaced apart by distances greater than the size of each secondary mirror itself.

3. A space telescope as defined in claim 1, wherein the space telescope orbits a body in space.

4. A space telescope as defined in claim 3, wherein the space telescope receives electromagnetic radiation from the orbited body to observe the orbited body.

5. A space telescope as defined in claim 3, wherein the space telescope receives electromagnetic radiation from, and thereby observes, a selected celestial source.

6. A space telescope as defined in claim 3, wherein the space telescope orbits the Earth.

* * * * *